Patented June 28, 1932

1,864,659

UNITED STATES PATENT OFFICE

WILHELM MEISER, OF LEVERKUSEN-ON-THE-RHINE, GERMANY, ASSIGNOR TO GENERAL ANILINE WORKS, INC., OF NEW YORK, N. Y., A CORPORATION OF DELAWARE

LEUCO SULPHURIC ACID ESTERS OF THE UREAS OF BETA-LEUCO-AMINOANTHRAQUINONES

No Drawing. Application filed May 9, 1931, Serial No. 536,315, and in Germany May 14, 1930.

The present invention relates to a process of preparing leuco sulphuric acid esters or ester salts of ureas of leuco-beta-aminoanthraquinone and nuclear halogen substitution products thereof.

Leuco sulphuric acid esters or ester salts of the ureas of beta-leuco-aminoanthraquinone or of nuclear halogen substitution products thereof have not hitherto been described.

In accordance with the present invention these products are obtained by causing the 9.10-leuco-disulphuric acid ester of beta-aminoanthraquinone or ester salts thereof or nuclear halogen substitution products of these compounds to react with phosgene in the presence of an alkaline acid binding agent, such as sodium- or potassium carbonate, -acetate, magnesium oxide, dilute caustic alkali solutions etc. The 9.10-leuco disulphuric acid esters or ester salts employed as starting materials can be obtained, for example, by esterification of leuco-beta-acetylaminoanthraquinone or nuclear halogen substitution products thereof with chlorosulphonic acid and subsequent saponification of the acetylamino group. The reaction of these substances with phosgene proceeds very smoothly even at normal temperature and yields the corresponding ureas in very good yield and purity. The present process thus provides a simple and economic method for the manufacture of the products, which are intended to find application in dyeing and printing. For example, they may be dyed on textile fibres from an alkaline bath, and the dyeings developed by an aftertreatment with oxidizing agents in an acid medium, such as sodium nitrite in dilute hydrochloric acid, sodium bichromate, in dilute sulphuric acid etc. The printing of textile fabrics with the new products may be performed by applying to said fabrics printing pastes containing besides the esters or ester salts in question sodium chlorate and ammonium thiocyanate and developing the printings by steaming and soaping at the boil.

The following example will illustrate my invention, without however, restricting it thereto:—

*Example*:—Phosgene is passed into an aqueous solution of the potassium salt of the beta-amino-anthrahydroquinone-9.10-disulphuric acid ester, the solution being rendered alkaline with sodium carbonate in an amount at least sufficient to bind the hydrochloric acid which is liberated during the reaction. The reaction is finished as soon as a free amino group can no longer be detected in a test portion taken from the reaction mixture. When working in a sufficiently concentrated solution, the urea separates out directly, otherwise it is salted out.

It probably possesses the following constitution:—

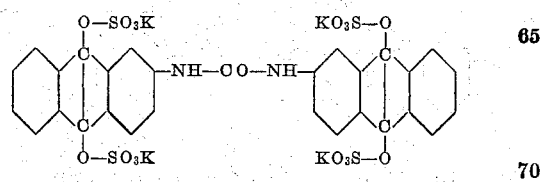

The product forms a brown powder, easily soluble in water. It can be developed on textile fibres to yellow dyeings of good fastness properties.

Instead of the beta-amino-anthrahydroquinone-9.10-disulphuric acid ester, nuclear halogen substitution products thereof may be applied, for example, leuco-2-amino-3-bromo-anthraquinone-9.10-disulphuric acid ester or leuco-1-chloro-6-aminoanthraquinone-9.10-disulphuric acid ester. The ureas derived from these and similar halogen compounds correspond in view of their properties to the urea derived from leuco-beta-aminoanthraquinone disulphuric acid ester itself.

I claim:—

1. Process which comprises reacting upon a compound of the probable formula

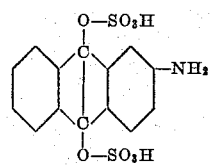

the nuclei of which may be substituted by halogen atoms, with phosgene in the presence of an alkaline acid binding agent.

2. Process which comprises reacting upon the compound of the probable formula

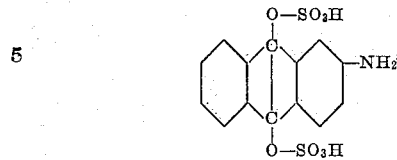

with phosgene in the presence of water and of an alkali metal carbonate.

3. The new compounds having in their free form the probable formula

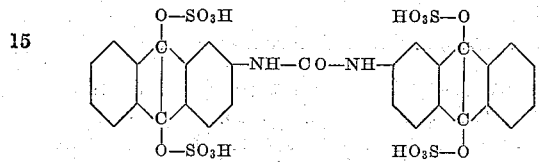

wherein the nuclei may be substituted by halogen atoms, said compounds being in form of their alkali metal salts brown powders easily soluble in water, being split up to the ureas of 2-aminoanthraquinone or nuclear halogen substitution products thereof by treatment with oxidizing agents in an acid medium.

4. The product of the probable formula

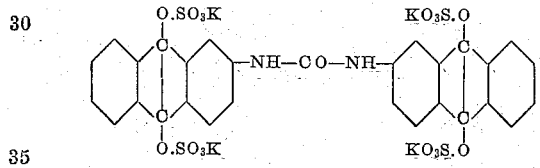

forming a brown powder, easily soluble in water.

In testimony whereof, I affix my signature.
WILHELM MEISER.